United States Patent [19]

Lupkas

[11] Patent Number: 5,691,855
[45] Date of Patent: Nov. 25, 1997

[54] MOTOR VEHICLE WIDE ANGLE REAR VIEW MIRROR

[75] Inventor: Raymond Robert Lupkas, Trumbull, Conn.

[73] Assignee: Jacqueline M. Lupkas, Trumbull, Conn.

[21] Appl. No.: 513,474

[22] Filed: Aug. 14, 1995

[51] Int. Cl.$^6$ .............. G02B 5/08; G02B 7/182; G02B 5/10

[52] U.S. Cl. .......... 359/866; 359/862; 359/864; 359/865

[58] Field of Search ............ 359/866, 850, 359/855, 844, 865, 843, 871, 872, 860, 864, 841, 849, 862

[56] References Cited

U.S. PATENT DOCUMENTS

| | | | |
|---|---|---|---|
| 3,009,392 | 11/1961 | Snell | 359/866 |
| 3,826,563 | 7/1974 | Davis | 359/865 |
| 4,022,520 | 5/1977 | Scifres | 350/304 |
| 4,293,191 | 10/1981 | Kim | 350/293 |
| 4,890,907 | 1/1990 | Vu et al. | 359/865 |
| 4,998,812 | 3/1991 | Hou | 350/604 |
| 5,044,739 | 9/1991 | do Espirito Santo | 359/865 |
| 5,050,977 | 9/1991 | Platzer, Jr. | 359/866 |
| 5,100,093 | 3/1992 | Rawlinson | 248/480 |

FOREIGN PATENT DOCUMENTS

| 2441088 | 3/1976 | Germany | 359/866 |
|---|---|---|---|

*Primary Examiner*—Paul M. Dzierzynski
*Assistant Examiner*—Mohammad Y. Sikder
*Attorney, Agent, or Firm*—Martin D. Wittstein

[57] ABSTRACT

A wide angle rear view mirror assembly for a motor vehicle has a supplemental optically flat wide angle mirror element mounted in a frame which in turn is mounted on the main rear view mirror assembly of a motor vehicle in juxtaposition with the main frame of the main rear view mirror assembly. The wide angle rear view mirror assembly is an after market device in one embodiment and is adapted to be mounted directly on the main mirror element of the main rear view mirror assembly, but can also be integrally built into the housing of the main rear view mirror assembly so as to constitute a feature of the automobile as manufactured. Either way, the wide angle rear view mirror assembly substantially increases the driver's rear view angle of vision utilizing an optically flat mirror, and also has provision for changing the vertical position of the angle of reflection of the wide angle mirror to accommodate different driving circumstances which affect what the driver sees in the wide angle mirror.

12 Claims, 7 Drawing Sheets

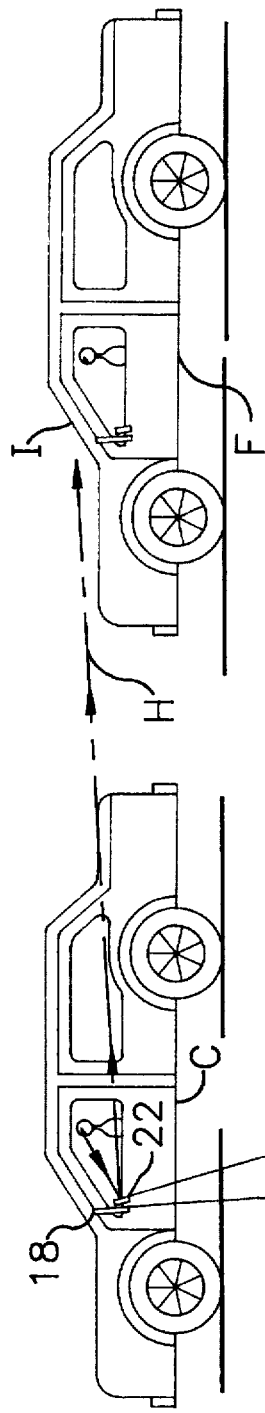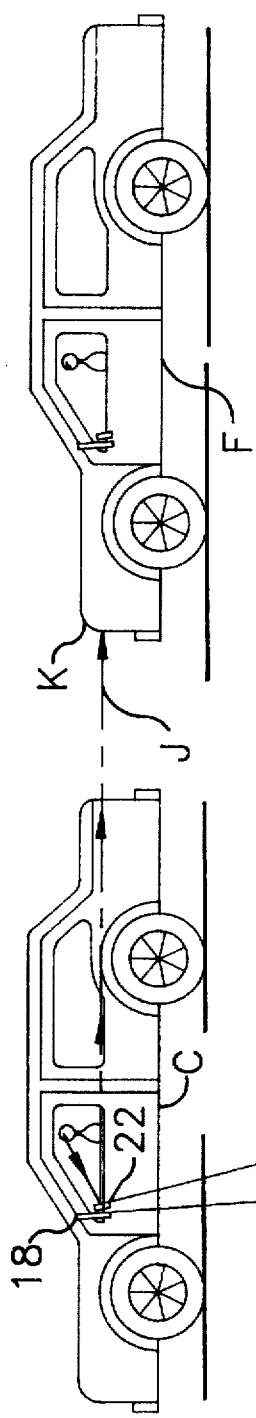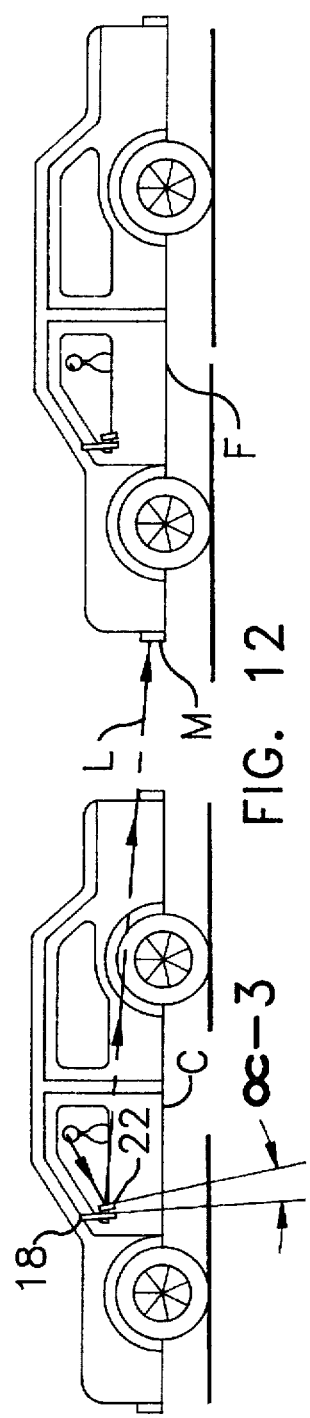

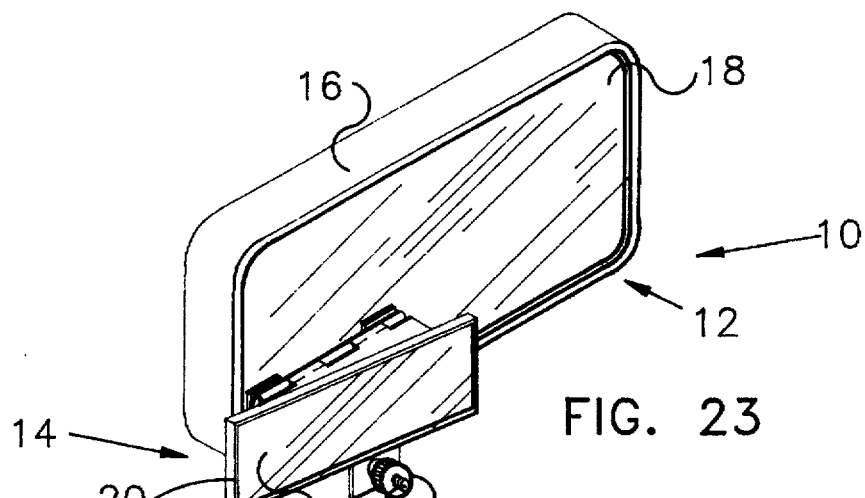
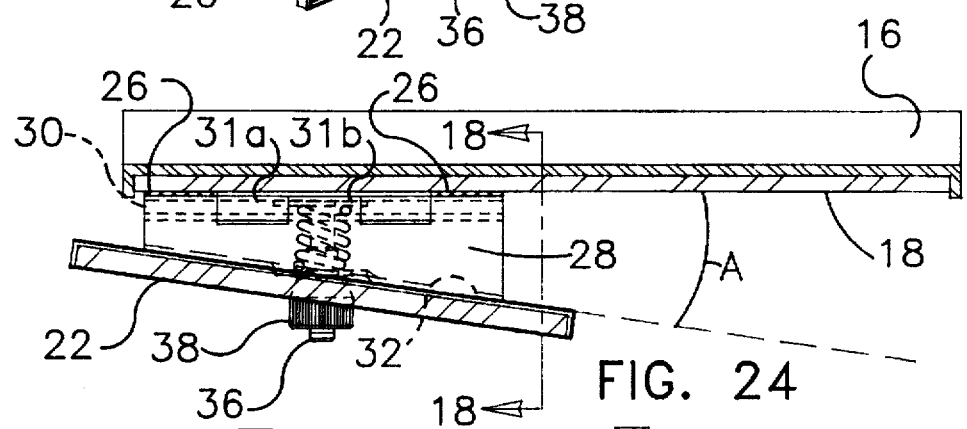
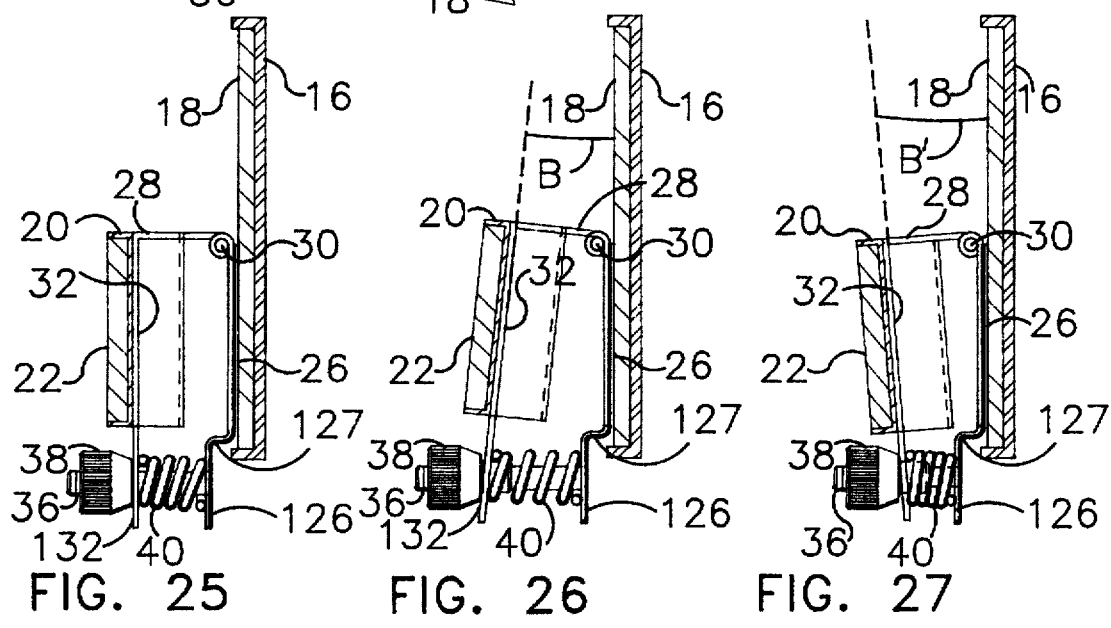

MOTOR VEHICLE WIDE ANGLE REAR VIEW MIRROR

BACKGROUND OF THE INVENTION

The present invention relates generally to the field of outside rear view mirrors for motor vehicles, and more particularly to a wide angle rear view mirror that expands the angle of vision of the driver beyond that afforded by the main rear view mirror normally mounted on or adjacent to the driver side door of the motor vehicle.

It should be noted at the outset that the following discussion, description of the invention and the claims are directed to a device adapted primarily for use in connection with the type of rear view mirrors normally mounted on the sides of automobiles; however, the principles of the invention are applicable to, and the scope of the invention as defined in the appended claims is deemed to include, other forms of motor vehicles, such as trucks and buses.

Outside rear view mirrors have long been well known, having originated well over half a century ago as an after market accessory which could be attached in some manner to the driver side door of motor vehicles, such as by being clamped to the forward edge of the door. Prior to the advent of outside rear view mirrors, a driver's rear vision was limited to the angle of vision through the conventional inside rear view mirror that was permitted by the length of the rear window of the motor vehicle. This angle of vision was quite satisfactory in affording the driver an adequate view of other vehicles following both directly behind his vehicle at any distance and other vehicles following at a considerable distance which were not directly behind his vehicle, such as in adjacent lanes on a multi-lane highway. This angle of vision, however, was completely inadequate to provide the driver with a view of other vehicles traveling in lanes other than the lane in which he is traveling, either at a relatively close distance behind him or when the other vehicle is along side of him, such as in the course of passing. Thus, the portion of the body of the driver's vehicle between the ends of the rear window and whatever side windows were provided created a "blind spot" which prevented the driver from seeing another vehicle in a zone extending generally from the point at which the other vehicle was beyond the included angle of the inside rear view mirror through the rear window to the point at which the other vehicle was sufficiently along side of the driver's vehicle that the driver could see the other vehicle through a side window. This blind spot clearly created a significant safety hazard in that the driver typically had to turn his head, thereby diverting his attention from the road ahead, to ensure that there were no other vehicles with which he might collide if he changed his driving lane. It was recognized at the outset of the development of outside rear view mirrors that they could significantly reduce the extent of the "blind spot" and greatly improve the range of visibility to the driver of other vehicles which are sufficiently close to him to present a potential hazard.

The safety advantage of the enhanced visibility afforded to the driver by these mirrors was so greatly apparent that motor vehicle manufacturers began providing them as permanently attached accessories built into the driver side door, and later into both driver side and passenger side doors. Initially, the mirror element was mounted in a frame which was adjustably connected to a bracket mounted on the vehicle that normally held the frame and mirror element in a fixed position. The mirror was adjusted for the angle of vision of individual drivers by manually pivoting the frame and mirror element in the bracket either horizontally and/or vertically, depending on the angle of vision desired by the driver. Subsequently, the mirror element was mounted in the frame for relative horizontal or vertical pivoting movement with respect to the frame, which was fixedly mounted on the motor vehicle, and movement of the mirror element was controlled by a cable connected to the mirror element and extending through the door to a lever mounted for universal movement, such that movement of the lever in any direction by the driver was translated to the mirror element to cause a corresponding movement thereof. Still later, with the development of such features as electrically operated windows and door locks, electric control of the adjustment of outside rear view mirrors has become an almost universal standard feature on motor vehicles. At some point in time, it became apparent that the safety factor of enhanced visibility from outside rear view mirrors was as applicable to the passenger side of a vehicle as to the driver side, as a result of which manufacturers commenced providing similar mirrors on the passenger side.

Despite the obvious safety advantage resulting from the enhanced visibility afforded to the driver by these outside rear view mirrors, it was found that they could not provide a sufficiently wide angle of vision to both entirely eliminate the aforementioned "blind spot" zone in which the driver's view of another vehicle was obscured by the portion of the body of his vehicle between the end of the rear window and the closest side window, and still provide a view of the other vehicle that was nearly or entirely adjacent to his vehicle, such as in the case of the other vehicle overtaking and passing the driver's vehicle. The reason for this is that the mirror element of the outside rear view mirror was flat, and therefore projected a real image of anything included in the driver's angle of vision through the mirror.

In recent times, this problem was solved with respect to the passenger side of the vehicle by providing the rear view mirror with a spherical convex mirror element, thereby affording a considerable range of wide angle vision. This solution, however, was not viable for the driver side rear view mirror due to the optical distortion caused by a convex mirror element which results in an object seen in the mirror appearing to be much further away from the driver's vehicle than it actually is, a condition which could easily mislead the driver into believing that there is considerably more clearance between his vehicle and another than what actually exists. This creates an obvious hazard both to the driver and to others closely adjacent to him.

One partial solution to this problem is that the driver attempts to obtain the best compromise between being able to see other vehicles within the entire blind spot zone and also those which are laterally adjacent or along side of him by adjusting the angle of the main rear view mirror to partially overlap both angles of vision. In other words, the driver normally has the option of adjusting his mirror so that his angle of vision is directed sufficiently toward the rear of his vehicle that he can see other vehicles in the entire blind spot zone, but he will not be able to see another vehicle that is closely adjacent to or along side of him, as in the course of passing. Alternatively, he can adjust the mirror so that his angle of vision is directed sufficiently outwardly of his vehicle that he can see at least the front portion of another vehicle without turning his head and relying on peripheral vision when the other vehicle is closely adjacent to or along side of his vehicle, but now he will not be able to see other vehicles which are located in a portion of the blind spot zone that are some distance behind his vehicle, but yet is not sufficiently far behind his vehicle to appear in the angle of vision of the inside rear view mirror. While this remaining blind spot zone may seem relatively small and of minor importance, the fact is that in the course of modern turnpike driving, in which many different types of motor vehicles are traveling in dangerously close proximity at speeds generally in the range of 55 to 75 miles per hour, even the slightest amount of inadequate or obscured vision presents a potential safety hazard for a serious accident which can easily result in serious injury or death. Under these conditions there is a high probability of multi-vehicle accidents resulting from the collision of two vehicles because one driver executed a maneuver without seeing that another vehicle was within a potential collision zone.

It has long been well known that the provision of some form of supplemental rear view mirror, mounted in direct association with the main outside rear view mirror, could expand a driver's included angle of vision beyond that provided by the main mirror, thereby further enhancing the safety factor afforded by the main outside rear view mirror, and many examples of such devices can be found in the prior art. These devices range from a relatively simple construction such as a fixed frame secured to a portion of the main mirror element by double sided adhesive tape with a convex mirror element, to relatively complex constructions in which the supplemental mirror assembly is mounted on the main mirror assembly for various forms of relative movement with respect thereto so as to be movable to and from operative positions or to facilitate adjustment in various directions. For the most part, these devices have not provided satisfactory results, either because of the distorted vision problem discussed above which is inherent in simple devices with convex mirrors, or because the more complex devices, despite their functional advantages, are so unwieldy, difficult to operate and expensive that they have not been commercially successful.

Another major problem with heretofore known supplemental wide angle rear view mirrors is that they have not included any means for adjusting the angle of reflection of the mirror so that the driver's line of sight to and from the mirror can be raised or lowered as desired to accommodate several objectives. Firstly, a driver may wish to focus the wide angle mirror on the windshield, the headlights and grille or the bumper area of another vehicle, without disturbing the established focus of the main rear view mirror. Secondly, a driver may wish to have the wide angle mirror mounted on an upper or lower corner of the main mirror, and be able to focus the wide angle mirror on the same area of a following vehicle regardless of the mounting location of the wide angle mirror. Thirdly, a wide angle mirror may have to be adjusted differently depending on whether it is mounted on an automobile on which the main rear view mirror is at a low level relative to the road, or on a truck on which the main rear view mirror is at a high level relative to the road; and there are height variations which must be accommodated even within these two categories, such as very low to the road sport cars compared to conventional sedans, and small trucks compared to trailer trucks. Finally, a wide angle mirror should be adjustable in elevation to accommodate the possibility that tall drivers having their eye levels at one height may require a different angle of reflection of the mirror than short drivers having their eye levels at a lower height. Also, with regard to this aspect, the same problem may be encountered with a single driver who, for purposes of maintaining comfort and avoiding fatigue, may wish to raise or lower his power seat during a long drive, thereby altering his line of sight to and from the wide angle mirror so that he does not see what he did prior to raising or lowering the seat.

Thus, there is a need for a wide angle rear view mirror assembly that is of simple design so as to be functionally and commercially acceptable, and yet provide a driver with all of the supplemental wide angle vision that is required for complete safety in avoiding potential collision situations with other vehicles, as well as features of adjustment to afford a driver with a range of angle of reflection options for what he may desire to see under varying circumstances of how the wide angle mirror is mounted, the type of vehicle on which it is mounted and certain physical attributes of different drivers.

SUMMARY OF THE INVENTION

The wide angle rear view mirror assembly of the present invention substantially obviates, if not entirely eliminates, the disadvantages and shortcomings of prior art wide angle rear view mirror devices in that it is of relatively simple design, making it economical to manufacture and maintain, and provides a driver with a sufficiently wide included angle of vision to enable him to see adjacent motor vehicles from the moment they leave the angle of vision of the interior rear view mirror and existing exterior rear view mirror until they are directly visible alongside of the driver's vehicle, and without the attendant distortion inherent in convex mirrors. In addition, it affords the driver the adjustment features to effectively accommodate the aforementioned situations where vertical adjustment in the line of sight to and from the mirror is either essential or at least highly desirable.

In its broader aspects, the present invention is a wide angle rear view mirror assembly adapted to be associated with the main rear view mirror assembly that is normally mounted on the side of a motor vehicle, and comprises a supplemental frame member, a supplemental rear view mirror element mounted in the supplemental frame member, the supplemental rear view mirror element being optically flat. There is a means mounting the supplemental frame member on the main rear view mirror assembly in juxtaposition with the main frame of the main rear view mirror assembly such that the supplemental mirror element lies in a plane which is disposed at a first angle relative to the plane of the main mirror element, the first angle lying in a plane that is perpendicular to the plane of the main mirror element. The mounting means also includes means permitting pivotal movement of the supplemental frame member and the supplemental mirror element about a pivot axis that is parallel to the longitudinal axis of the main mirror element such that the supplemental frame member and the supplemental mirror element can move angularly about the pivot axis through a second angle which lies in a plane perpendicular to the plane of the first angle. Finally, there is a means for moving the supplemental frame member through the second angle and for maintaining the supplemental frame member and the supplemental mirror element in any given position within the second angle, so that the supplemental mirror element expands the included angle of vision of a driver of the motor vehicle beyond the included angle of vision provided by the main mirror element of the main rear view mirror assembly of the motor vehicle.

In some of its more limited aspects, the wide angle rear view mirror assembly of the present invention includes, in one embodiment thereof, means for mounting the supplemental frame member directly on a portion of the surface of the main rear view mirror element, and this means in turn includes a first means for securing the supplemental frame member to the outer surface of the main mirror element, and second means connecting the supplemental frame member to the first means with the plane of the supplemental mirror element disposed at the first angle and which permits the angular movement of the supplemental frame member and the supplemental mirror element about the pivot axis.

The first means includes a plate member suitably secured to the outer surface of the main mirror element, and the second means comprises means pivotally connecting the supplemental frame member to the first plate which permits the supplemental frame member and the supplemental mirror element to move through the aforementioned second angle.

There is an adjustable control means operatively associated with the first plate and the supplemental frame member for moving the supplemental frame member through the second angle, the control means including an elongate threaded member operatively interconnected between the first plate and the supplemental frame member, resilient means captured between the first plate and the supplemental frame member for urging the supplemental frame member in one direction of angular movement about the pivot axis, and an actuating knob rotatably mounted on the threaded member and cooperating with the supplemental frame member for moving the supplemental frame member in the opposite direction of angular movement against the bias of the resilient means. Thus, by manually rotating the actuating knob, a driver can pivot the supplemental mirror element through the second angle to adjust the elevation of the angle of reflection of the supplemental mirror element with respect to the main mirror element to compensate for different lines of sight from the driver to the supplemental mirror element depending on the level of the driver's eyes relative to the supplemental mirror element to achieve a desired angle of reflection of the supplemental mirror element to accommodate the various circumstances set forth above.

In another embodiment of the invention, the wide angle rear view mirror assembly is formed integrally with the main rear view mirror assembly during the manufacture of the main rear view mirror assembly in a manner in which both mirror assemblies are contained within a common housing which is attached to a motor vehicle during the original manufacture thereof. The common housing has first and second portion disposed in vertical orientation with each other, the first portion containing the main rear view mirror assembly and the second portion containing the wide angle rear view mirror assembly. The elevation of the angle of vision of the driver to the main mirror element determines which of the two portions of the housing is above the other so that the driver's line of vision to the main mirror element is not blocked by the second portion of the housing regardless of where on the motor vehicle the common housing is mounted.

Having briefly described the general nature of the present invention, it is a principal object thereof to provide a wide angle rear view mirror assembly which is adapted to be easily associated with the main mirror element of the main rear view mirror assembly that is normally mounted on the outer side of a motor vehicle and which expands the included angle of vision of a driver beyond the included angle of vision normally provided by the main mirror element.

It is another object of the present invention to provide a wide angle rear view mirror assembly in which the blind spot normally encountered with conventional outside rear view mirrors is entirely eliminated without the use of convex mirrors which cause distortion.

It is still another object of the present invention to provide a wide angle rear view mirror assembly which provides for vertical adjustment of the angle of reflection to compensate for differences in the height of the driver's eyes relative to the wide angle mirror element to achieve a desired angle of reflection to accommodate various driving circumstances.

It is still another object of the present invention to provide a wide angle rear view mirror assembly which can be conveniently mounted in any corner of the main mirror element and with the adjusting control components of the wide angle mirror assembly out of the field of vision through the main mirror assembly.

It is yet another object of the present invention to provide a wide angle rear view mirror assembly in which both the main rear view mirror assembly the wide angle rear view mirror assembly are integrally formed with the housing which normally is a part of the main rear view mirror assembly, such that both mirror assemblies constitute a single component that is installed on a vehicle by the manufacturer thereof.

These and other objects and advantages of the present invention will become more apparent from an understanding of the following detailed description of presently preferred embodiments of the invention, when considered in conjunction with the accompanying drawings.

BRIEF DESCRIPTION OF THE DRAWINGS

FIGS. 10 through 12 illustrate three different positions of vertical adjustment of the wide angle mirror element relative to the main mirror element to obtain three different angles of reflection of the wide angle mirror element relative to the main mirror element.

FIGS. 23 through 27 are views similar to FIGS. 1 through 5 respectively, showing another embodiment of the invention in which the wide angle rear view mirror assembly is secured to the lower left corner of the main rear view mirror assembly.

Identical parts illustrated throughout all of the views are identified by the same reference numerals.

DETAILED DESCRIPTION OF THE INVENTION

Figure 1:
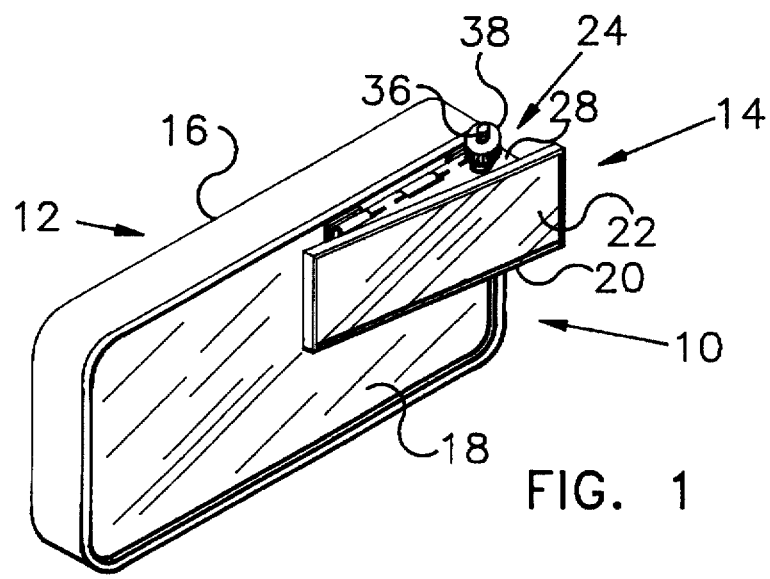
FIG. 1 is a perspective view of one embodiment of a wide angle rear view mirror assembly which is adapted to be sold as an after market device and secured to the upper right corner of the main rear view mirror assembly.

Referring now to the drawings, and particularly to FIG. 1 thereof, the reference numeral 10 generally indicates a rear view mirror assembly for a motor vehicle which incorporates the principles of the present invention. The rear view mirror assembly 10 comprises a main rear view mirror assembly, indicated generally by the reference numeral 12, and a wide angle mirror assembly, indicated generally by the reference numeral 14, which is adapted to be secured to the upper right corner of the main mirror assembly 12. The wide angle mirror assembly 14 can be associated with the main mirror assembly 12 either by being attached thereto or manufactured therewith, depending on whether the wide angle mirror assembly is purchased as an after market device and attached to the main mirror assembly, or is formed integrally therewith as part of the manufacture of the main mirror assembly for the motor vehicle, as more fully explained below.

The main mirror assembly 12 typically comprises a main frame 16 which is suitably connected to the motor vehicle, again either affixed thereto if it is purchased as an after market device or is formed integrally with a portion of the motor vehicle by the manufacturer. In either event, the main mirror assembly 12 also includes a main mirror element 18 suitably mounted in the frame 16, either in a fixed or movable relationship with respect thereto. Again, if the main mirror assembly 12 is purchased as an after market device, the main mirror element 18 is generally fixed with respect to the frame 16 because the frame itself is adjustably mounted on a bracket by which the main mirror assembly 12 is attached to the motor vehicle. If, on the other hand, the main mirror assembly 12 is formed integrally with the motor vehicle by the manufacturer, the frame 16 is fixed with respect to the motor vehicle, and the main mirror element 18 is movably mounted with respect to the frame 16 so that the reflective position of the main mirror element 18 can be adjusted with respect to the frame 16.

FIGS. 1 through 5 illustrate one embodiment of the wide angle mirror assembly 14 which is manufactured as an after market device and which is adapted to be associated with the upper right corner of the main mirror assembly 12 that is provided on the motor vehicle by the manufacturer thereof. Thus, the wide mirror assembly 14 comprises a supplemental frame member 20 which is shown as rectangular in configuration, although any peripheral shape may be utilized. A correspondingly shaped supplemental mirror element 22 is attached to the frame member 20, typically by bonding with a suitable adhesive.

Figure 3:
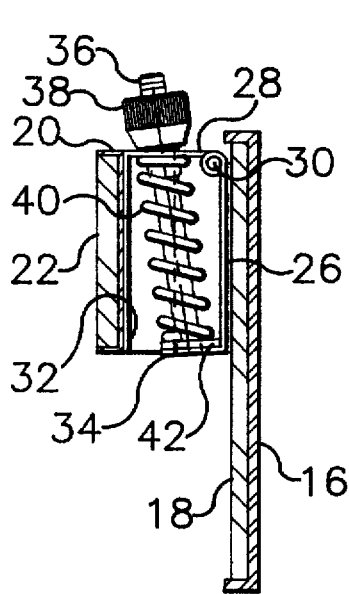
FIG. 3 is a sectional view taken on the line 3—3 of FIG. 2, showing the supplemental mirror assembly disposed in a vertical plane substantially parallel to the plane of the main mirror element.
Figure 4:
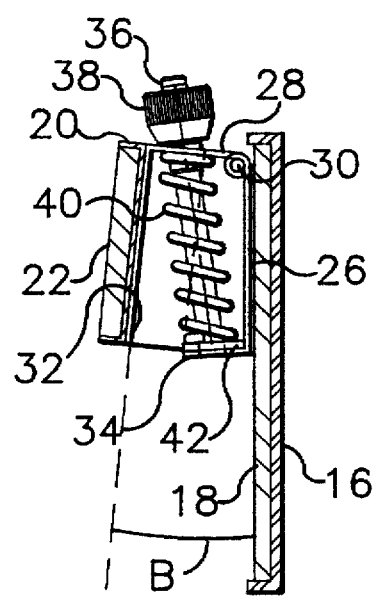
FIG. 4 is a view similar to FIG. 3, but showing the supplemental mirror assembly in a plane that is elevated relative to the plane of the main mirror element.
Figure 5:
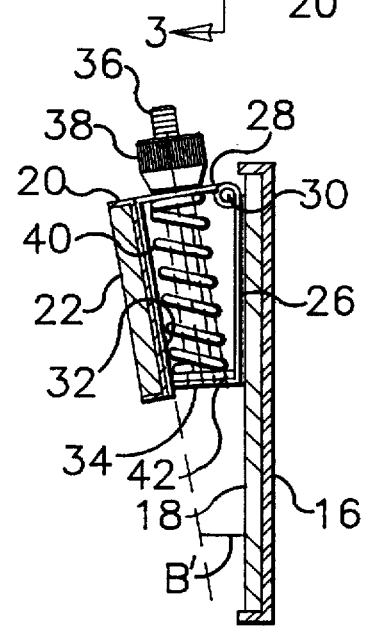
FIG. 5 is a view similar to FIG. 3 but showing the supplemental mirror assembly in a plane that is depressed relative to the plane of the main mirror element.

The frame member 20 is attached to the main mirror element 18 by a mounting means, indicated generally by the reference numeral 24, which disposes the supplemental mirror element 22 in a plane which is at a first angle to the plane of the main mirror element 18, which angle lies in a plane that is perpendicular to the plane of the main mirror element 18, the mounting means 24 also including means permitting pivotal movement of the supplemental frame member 20 and the supplemental mirror element 22 about a pivot axis that is parallel to the longitudinal axis of the main mirror element 18, such that the supplemental frame member 20 and the supplemental mirror element 22 can move angularly about the pivot axis through a second angle which lies in a plane that is perpendicular to the plane of the first angle, as explained in more detail below. Thus, as seen in FIGS. 2 through 5, the mounting means 24 comprises a first generally elongate flat plate 26 which is suitably secured to the main mirror element 18, such as by a suitable bonding material or double sided adhesive tape. A second generally elongate flat plate 28 is pivotally secured to the first plate 26 by a hinge 30 that is received in adjacent tabs 31a and 31b formed on the first and second plates 26 and 28 respectively so that the second plate 28 can move angularly with respect to the first plate 26. The hinge 30 defines a pivot axis for the second plate 28 that is parallel to the longitudinal axis of the main mirror element 18. As best seen in FIGS. 3–5, a third generally elongate flat plate 32 is connected to or formed integrally with the second plate 28, such that the second and third plates 28 and 32 form an L-shaped bracket that is pivotally connected to the first plate 26 by the hinge 30. The supplemental frame member 20 is suitably secured, again such as by a bonding material or double side adhesive tape, to the outer surface of the third plate 32, thereby securing the supplemental frame member 20 and the supplemental mirror element 22 to the bracket defined by the second and third plates 28 and 32.

Figure 2:
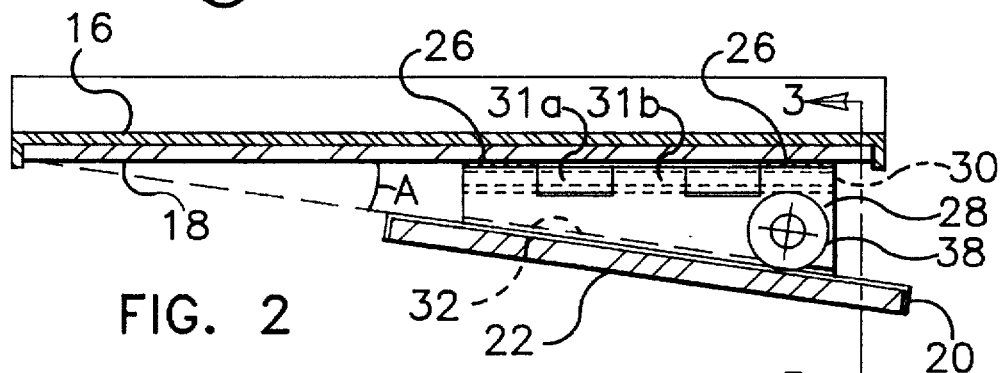
FIG. 2 is a plan view looking down at the top of the wide angle rear view mirror assembly as seen in FIG. 1.

As best seen in FIG. 2, the second plate 28 has a tapered configuration such that the outer edge thereof is disposed at an angle "A" to the plane of the main mirror element 18, the angle "A" lying in a plane that is perpendicular to the plane of the main mirror element 18. This configuration results in the third plate 32 being disposed at the same angle to the plane of the main mirror element 18, thereby disposing the supplemental frame member 20 and the supplemental mirror element 22 at the same angle to the plane of the main mirror element 18.

The mounting means 24 further includes a relatively short outwardly extending projection 34 which is either secured to or formed integrally with the first plate 26 at the opposite end thereof from the pivot axis defined by the hinge 30. An elongate threaded shaft 36 is suitably non-rotatably mounted in the projection 34 and extends therefrom through an aperture formed in the second plate 28 sufficiently far to permit an actuating knob 38 to be rotatably mounted on the portion of the shaft 36 that projects beyond the outer surface of the second flat plate 28. A compression spring 40 is captured between the adjacent inner surfaces of the projection 34, where it bears against a formed surface 42, and the second plate 28 so as to constantly urge the outer surface of the second plate 28 into engagement with the inner surface of the actuating knob 38.

It will be apparent from the description thus far, and from comparing FIGS. 3–5, that rotation of the actuating knob in either direction will result in angular movement of the second plate 28 with respect to the first plate 26 about the axis defined by the hinge 30. It will be seen that the second plate 28 can be moved approximately through an angle defined by the difference between the angles shown in FIGS. 4 and 5 indicated by the letters "B" and "B'", this angle lying in a plate that is perpendicular to the plane of the angle labeled "A". Since the supplemental frame member 20 and the supplemental mirror element 22 are mounted on the third plate 32 which is connected to the second plate 28, the supplemental mirror element 22 moves through the same angle during rotation of the actuating knob 38. This angular adjustment of the supplemental frame member 20 and the supplemental mirror element provides for different vertical adjustment of the supplemental mirror element 22 to obtain different angle of reflection of the supplemental mirror element 22 relative to the main mirror element 18 so that a driver can maintain a desired location on another vehicle in proper focus in the supplemental mirror element 22 regardless of the vertical adjustment of the main mirror element 18, as more fully described hereinafter.

FIGS. 6 through 9 illustrate the manner in which the present invention functions to afford the driver of a motor vehicle about to be overtaken and passed at least partial to full visibility of the passing motor vehicle at all times that the two vehicles are in close proximity and until the driver of the vehicle being passed can see the passing vehicle directly. Thus, in FIG. 6, the letter C represents the vehicle that is being overtaken and passed, and which is equipped with a main rear view mirror assembly 10 and the wide angle rear view mirror assembly 12 of the present invention. The normal included angle of vision of the driver of vehicle C through the main rear view mirror assembly 10 is represented by the uniform dotted lines D and D', and the normal included angle of vision of the driver of vehicle C through the wide angle rear view mirror assembly is represented by the long and short dotted lines E and E'. The letter F represents the vehicle that is overtaking and passing the vehicle C.

Figure 6:
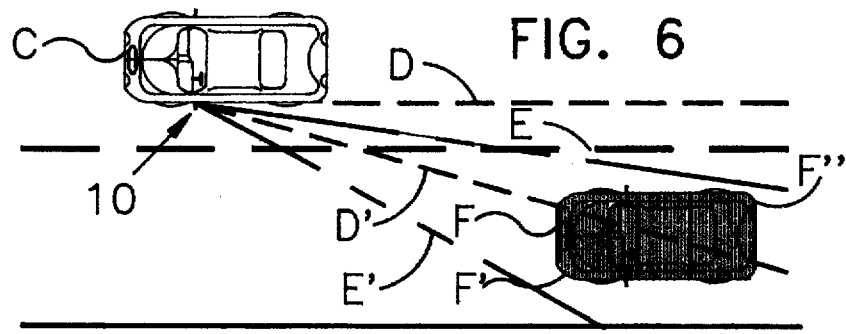
FIGS. 6 through 9 illustrate four successive relative positions of a motor vehicle equipped with a wide angle rear view mirror assembly of the present invention being passed by another motor vehicle, and the relative degree of visibility of the passing vehicle by the driver of the motor vehicle being passed both with and without the present invention.

As seen in the figures, the dotted line D represents the line of sight of the driver of vehicle C that is closest to his vehicle without being interrupted by his vehicle, and which is adjacent and generally parallel to the side of his vehicle. Thus, when vehicle F pulls out from the driving lane of vehicle C, in which the driver of vehicle C can see vehicle F through the interior rear view mirror and the rear window of his vehicle, vehicle F will become visible to the driver of motor vehicle C through the main rear view mirror assembly 10 as soon as the left front corner F' of vehicle F crosses the line D, and will become entirely visible when the right rear corner F''' crosses the line D. As seen in FIG. 6, however, the left front corner F' of vehicle F has already crossed the line D', which extends substantially diagonally through vehicle F from the right front corner to the left rear corner, and that portion of vehicle F that is beneath the line D' is out of the included angle of vision of the main rear view mirror assembly 10 on vehicle C. However, the entire vehicle F remains in view of the driver of vehicle C because the portion of vehicle F that is out of the included angle of vision of the main mirror assembly 10 is still within the included angle of vision of the wide angle rear view mirror assembly 12, as represented by the lines E and E'.

Figure 7:
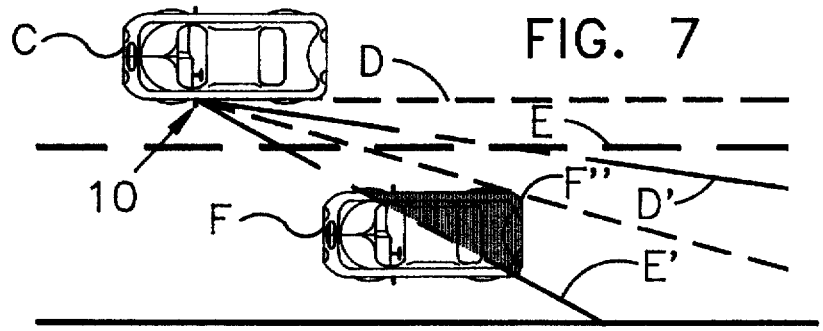

As motor vehicle F overtakes vehicle C, as seen in FIG. 7, approximately one half of vehicle F is still visible to the driver of vehicle C when the front end of vehicle F is approximately adjacent to the rear end of vehicle C. This is the approximate location where vehicle C driver's vision of vehicle F would become entirely obstructed, i.e., vehicle F would be entirely within the "blind spot" of the driver of vehicle C, without the benefit of the wide angle rear view mirror assembly 12 because the right rear corner F''' of vehicle F will have passed beyond the line D' and therefore vehicle F would not be visible in the main rear view mirror assembly 10 of motor vehicle C.

Figure 8:
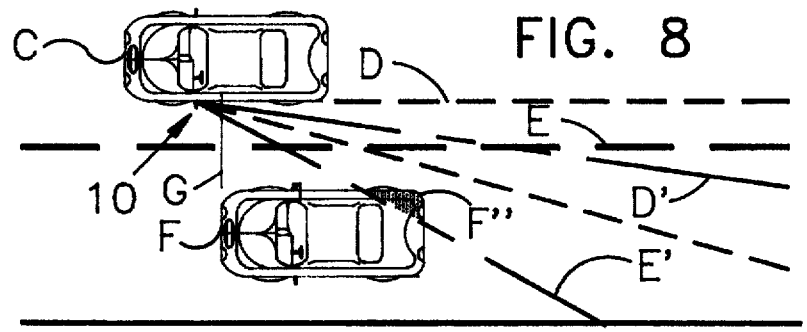

However, as seen in FIG. 8, with the benefit of the wide angle rear view mirror assembly 12 of the present invention, at least a small portion of the right rear portion of vehicle F will remain visible to the driver of vehicle C until the front end of vehicle F is adjacent to the peripheral line of sight of the driver of vehicle C, as indicated by the line G in FIG. 8, since this portion of vehicle F is still within the included angle of vision of the wide angle rear view mirror assembly 12 as indicated by the line E'.

Figure 9:
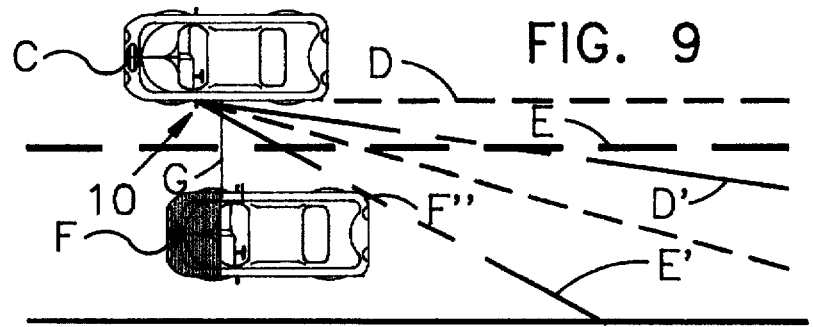
Figure 13:
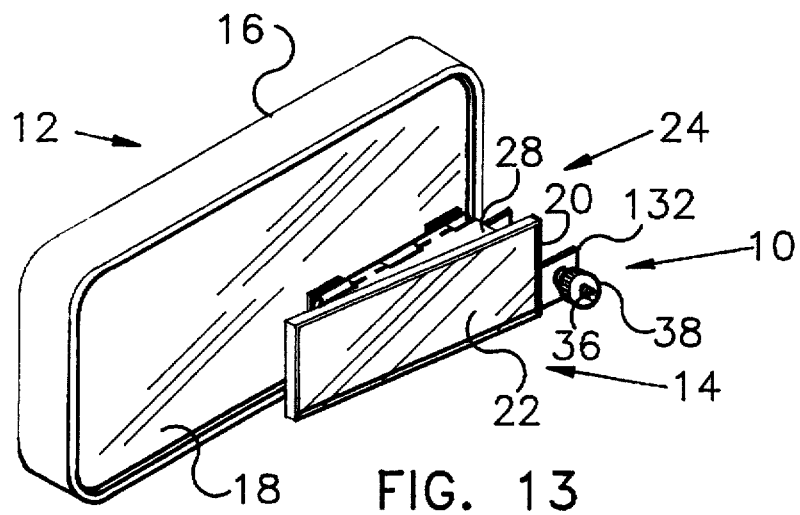
FIGS. 13 through 17 are views similar to FIGS. 1 through 5 respectively, showing another embodiment of the invention in which the wide angle rear view mirror assembly is secured to the lower right corner of the main rear view mirror assembly.
Figure 14:
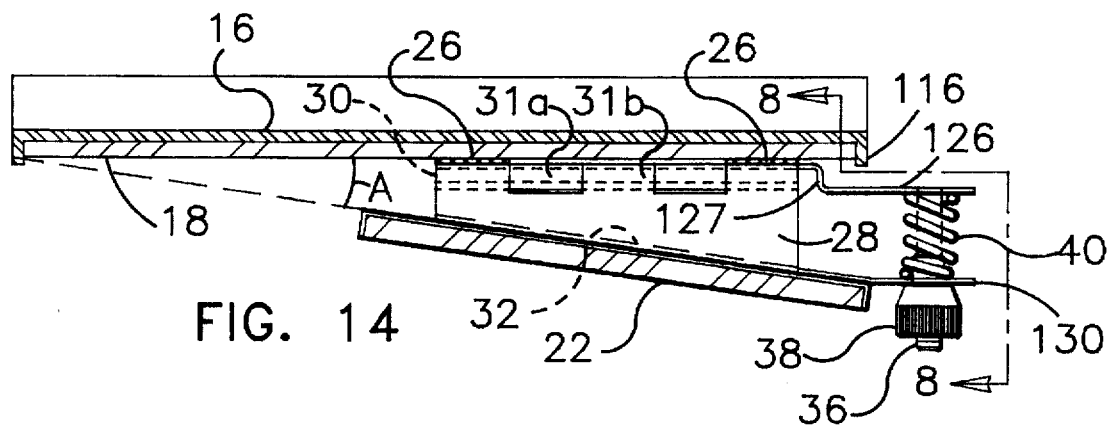
Figures 15, 16, 17:
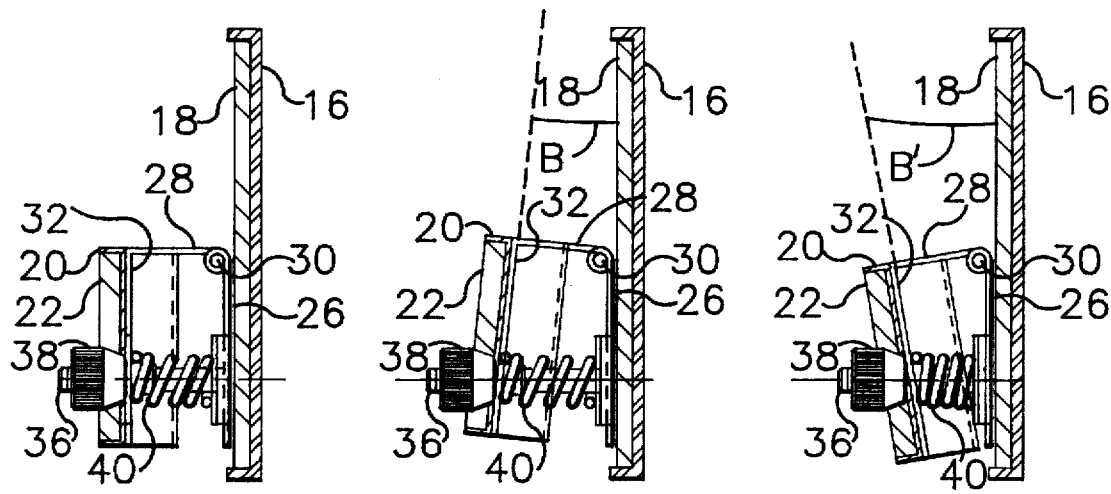
Figure 18:
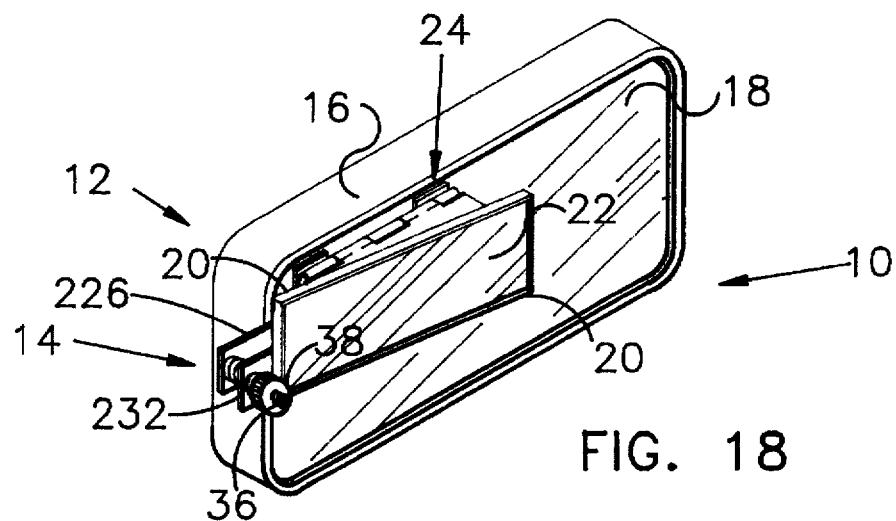
FIGS. 18 through 22 are views similar to FIGS. 1 through 5 respectively, showing another embodiment of the invention in which the wide angle rear view mirror assembly is secured to the upper left corner of the main rear view mirror assembly.
Figure 19:
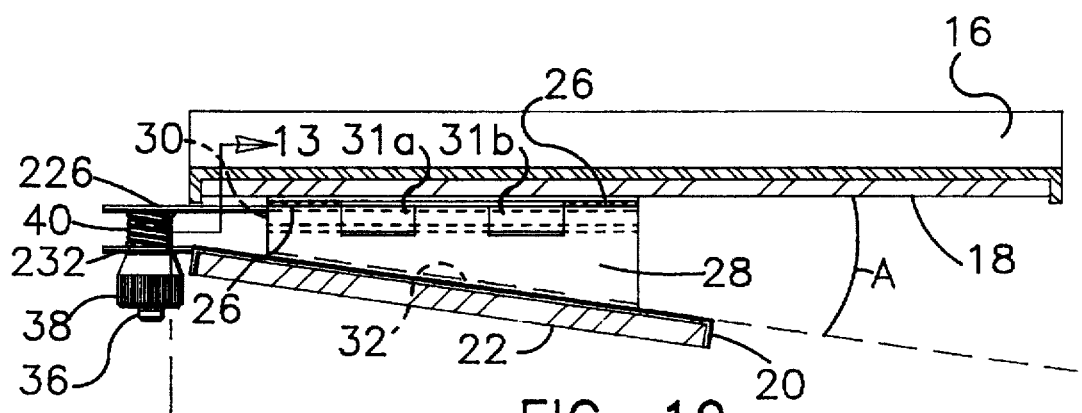
Figures 20, 21, 22:
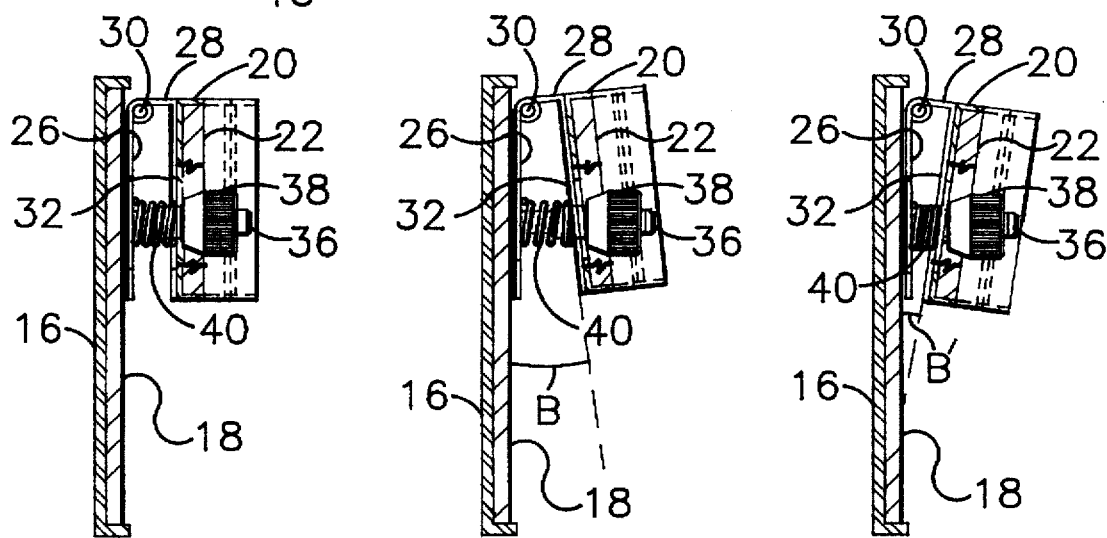

From FIG. 9, it will be seen that a substantial front portion of vehicle F becomes visible to the driver of vehicle C through his peripheral vision forward of the line G at the point when the right rear corner F''' of vehicle F finally passes beyond the line E' and out of the included angle of vision of the wide angle rear view mirror assembly 12, thus ensuring that a front portion of vehicle F becomes directly visible through peripheral vision before the rear portion is out of the included angle of vision of the wide angle rear view mirror assembly. Thus, at least some portion of vehicle F is within the vision of the driver of vehicle C during the entire period of time that vehicle F is overtaking and passing vehicle C, thereby ensuring complete safety to the driver of vehicle C during the entire maneuver.

FIGS. 10 through 12 illustrate the advantageous feature of the invention relating to the vertical adjustment of the supplemental frame member 20 and the supplemental mirror element 22 relative to the main mirror element 18 in order to provide a driver with different angles of reflection of the supplemental mirror element relative to the main mirror element. Thus, with reference to FIG. 10, and using the same reference letters as used in the preceding views, the driver of the lead vehicle C has his supplemental mirror element 22 adjusted so that hid angle of reflection, represented by the dotted line labeled "H", is directed to the windshield, labeled "I", of the passing vehicle F. In the situation shown in FIG. 11, the driver of vehicle C has the supplemental mirror element 22 adjusted so that his angle of reflection, represented by the dotted line labeled "J" is directed to the grille area, labeled "K", of vehicle F. And in the situation shown in FIG. 12, the driver has the supplemental mirror element 22 adjusted so that his angle of reflection, represented by the dotted line labeled "L", is directed at the bumper area, labeled "M", of vehicle F. These angles of reflection of the supplemental mirror element 22 are obtained by rotation of the knob 38 in either direction, depending upon whether it is necessary to raise or lower the angle of reflection of the supplemental mirror element 22.

It will be apparent, from the foregoing, that the previously stated objectives of this feature are achieved. Firstly, the driver of vehicle C can focus the supplemental mirror element 22 on any portion of the vehicle F that is within the included angle of vision in elevation of the supplemental mirror element 22 between the highest angle of adjustment as seen in FIG. 5 to the lowest angle of adjustment as seen in FIG. 5, and to be able to do so even though the angle in elevation of the main mirror element 18 may be altered by the driver. Further, the driver can focus the supplemental mirror element 22 on a given point on the vehicle F regardless of whether the supplemental mirror assembly 12 is mounted on an upper or lower corner of the main mirror element 18. Still further, it will now be apparent that the driver of vehicle C can maintain a focus on any desired area of the vehicle F regardless of whether he is in a relatively low position such as the automobile shown in these figures or in a relatively high position, such as the cab of a tractor trailer truck, in which case the supplemental mirror element 18 might have to be adjusted to the minimum possible vertical position as shown in FIG. 5. And finally, it should now be clear that even slight adjustment may be necessary to accommodate the differences in height within the same vehicle between the eye levels of different drivers in order to permit them to focus the supplemental mirror element 22 on the same areas of the vehicle F.

FIGS. 13 through 17 illustrate another embodiment of the invention in which the wide angle mirror assembly 14 is mounted on the lower right corner of the main rear view mirror assembly 12, and in which all parts of this embodiment common to the previously described embodiment are identified by the same reference numbers. Thus, it is not deemed necessary for a full understanding of the invention to repeat the foregoing description of these parts.

With reference to FIGS. 13 through 17, it will be seen that the principal difference between this embodiment and that described above is that the first and third plates 26 and 32 are each provided with a longitudinally extending tab 126 and 132 respectively, the tab 126 being connected to the plate 26 through a double right angle bend 127 in order to clear the outer edge 116 of the main frame 16 of the main mirror assembly 12. The threaded shaft 36 is fixedly mounted in the tab 126 and extends through a suitable aperture in the tab 132, and the compression spring 40 is captured between the adjacent inner surfaces of the tabs 126 and 132 so that the outer surface of the tab 132 is constantly urged against the inner surface of the actuating knob 38.

As with the previous embodiment, it will be apparent that rotation of the actuating knob 38 in either direction will result in angular movement of the second plate 28 with respect to the first plate 26 about the axis defined by the hinge 30. Again, the second plate 28 can be moved approximately through an angle defined by the difference between the angles shown in FIGS. 16 and 17 indicated by the letters "B" and "B'", this angle also lying in a plane that is perpendicular to the plane of the angle labeled "A". Since the supplemental frame member 20 and the supplemental mirror element 22 are mounted on the third plate 32 which is connected to the second plate 28, the supplemental mirror element 18 moves through the same angle during rotation of the actuating knob 38.

With reference to FIGS. 18 through 22, it will be seen that the principal difference between this embodiment and either of those described above is that the first and third plates 26 and 32 are each provided with a longitudinally extending tab 226 and 232 respectively, which are much closer together than the tabs 126 and 132 of the FIGS. 13 through 17 embodiment because they are connected to the opposite ends of the first and third plates 26 and 32 which maintain the same spatial relationship throughout all of the embodiments. The reason for this is that regardless of which corner of the main mirror assembly 12 the wide angle mirror assembly 14 occupies, the angle "A" between the plane of the main mirror element 18 and the longitudinal plane of the wide angle mirror 22 always remains the same. The threaded shaft 36 is fixedly mounted in the tab 226 and extends through a suitable aperture in the tab 232, and the compression spring 40 is captured between the adjacent inner surfaces of the tabs 226 and 232 so that the outer surface of the tab 232 is constantly urged against the inner surface of the actuating knob 38.

As with the previous embodiments, it will be apparent that rotation of the actuating knob 38 in either direction will result in angular movement of the second plate 28 with respect to the first plate 26 about the axis defined by the hinge 30. Again, the second plate 28 can be moved approximately through an angle defined by the difference between the angles shown in FIGS. 21 and 22 indicated by the letter "B", this angle also lying in a plane that is perpendicular to the plane of the angle labeled "A". Since the supplemental mirror frame 20 and mirror element 22 are mounted on the third plate 32 which is connected to the second plate 28, the supplemental mirror element moves through the same angle during rotation of the actuating knob 38.

With reference to FIGS. 23 through 27, it will be seen that the principal difference between this embodiment and those described above is that the first and third plates 26 and 32 are each provided with a longitudinally extending tab 126 and 132 respectively, the tab 126 being connected to the first plate 26 through a double right angle bend 127 in order to clear the outer edge 116 of the frame 16 of the main mirror assembly 12. The threaded shaft 36 is fixedly mounted in the tab 126 and extends through a suitable aperture in the tab 132, and the compression spring 40 is captured between the adjacent inner surfaces of the tabs 126 and 132 so that the outer surface of the tab 132 is constantly urged against the inner surface of the actuating knob 38.

As with the previous embodiment, it will be apparent that rotation of the actuating knob 38 in either direction will result in angular movement of the second plate 28 with respect to the first plate 26 about the axis defined by the hinge 30. Again, the second plate 28 can be moved approximately through an angle defined by the difference between the angles shown in FIGS. 26 and 27 indicated by the letters "B" and "B'", this angle also lying in a plane that is perpendicular to the plane of the angle labeled "A". Since the supplemental frame member 20 and the supplemental mirror element 22 are mounted on the third plate 32 which is connected to the second plate 28, the supplemental mirror element 22 moves through the same angle during rotation of the actuating knob 38.

Figure 28:
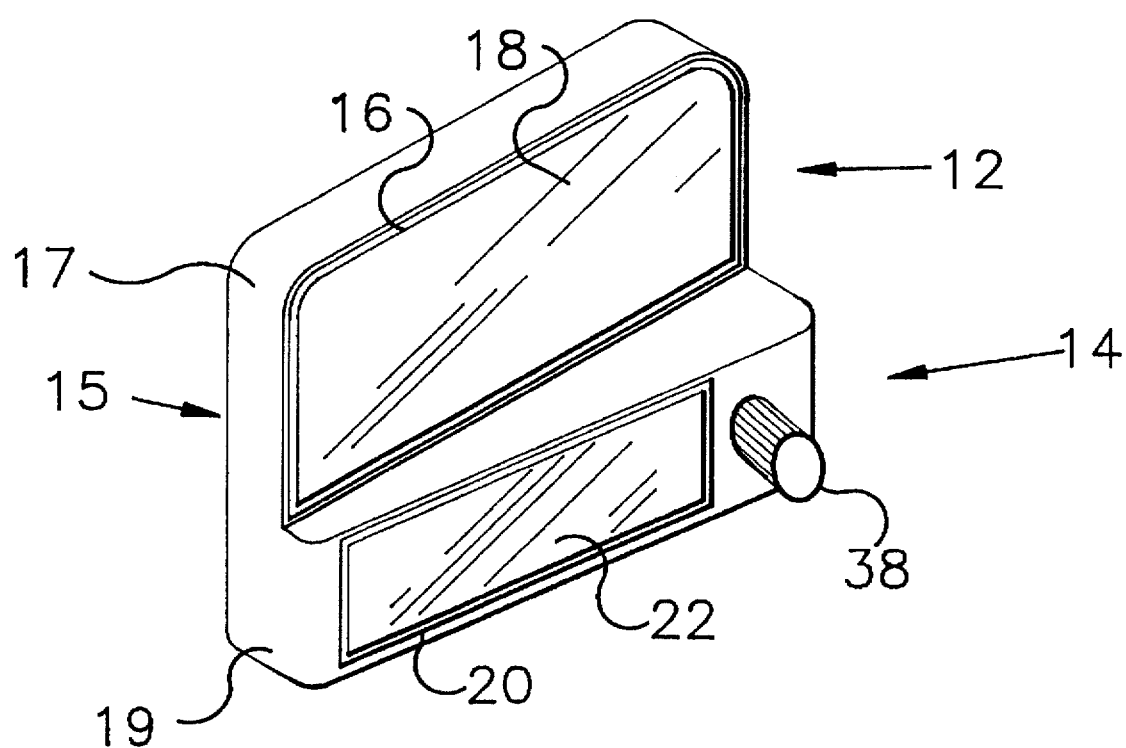
FIG. 28 is a view similar to FIG. 1 showing the wide angle rear view mirror assembly incorporated into the housing of the main rear view mirror assembly which is normally installed on new motor vehicles by the manufacturer.

FIG. 28, in which parts and components previously described are identified by the same reference numerals and new parts and components are identified by odd numbers, illustrates another embodiment of the invention in which the wide angle rear view mirror assembly 14 is formed integrally with the main rear view mirror assembly 12 during the manufacture of the main rear view mirror assembly in a manner in which both mirror assemblies are contained within a common housing which is attached to a motor vehicle during the original manufacture thereof. Thus, in the figure, there is seen a main rear view mirror assembly 12 and a wide angle rear view mirror assembly 14, both of which are received within a common housing indicated generally by the numeral 15. The housing 15 has a first or upper portion 17 in which the main frame 16 and the main mirror element 18 are mounted, and a second or lower portion 19 in which the supplemental frame member 20 and supplemental mirror element 22 are mounted. By comparing FIG. 28 with FIG. 13, it will be apparent that, in principle, the wide angle rear view mirror assembly 14 is the same in both figures with the exception that in FIG. 18 the assembly 14 is enclosed within the lower portion 19 of the housing 15, with the actuating knob 38 projecting outwardly in the same manner as it does in FIG. 13. It should be apparent without the need for further description or illustration that in this embodiment of the invention, the movement of the supplemental mirror element 22 can be controlled by an electric control device mounted in the housing 15 and suitably connected to the supplemental mirror element 22, the control device being operated by a suitable control element within the motor vehicle in the same manner as that presently utililzed to control the movement of the main mirror element 18 in rear view mirror assemblies as currently installed on motor vehicles by the manufacturer.

It will be seen in FIG. 28 that the first and second portions 17 and 19 respectively of the housing 15 are disposed in vertical orientation with respect to each other so that the wide angle mirror assembly 14 is disposed beneath the main mirror assembly 12, the purpose being to avoid having any part of the second portion 19 of the housing 15 block the driver's view of any portion of the main mirror element 18 when the housing 15 is mounted on the motor vehicle such that the driver's line of vision to the main mirror element 18 is angled downwardly. It should be apparent without the need for illustration that the reverse arrangement is possible and also appropriate when the housing 15 is mounted on the motor vehicle at a location in which the driver's line of vision to the main mirror element 18 is angled upwardly, as might very well be the case with a truck, in which case the second portion 19 of the housing 15 would be disposed above the first portion 17, again the purpose being to avoid having any part of the second portion 19 block the driver's view of any portion of the main mirror element 18.

It is to be understood that the present invention is not to be considered as limited to the specific embodiments described above and shown in the accompanying drawings, which are merely illustrative of the best modes presently contemplated for carrying out the invention and which is are susceptible to such changes as may be obvious to one skilled in the art, but rather that the invention is intended to cover all such variations, modifications and equivalents thereof as may be deemed to be within the scope of the claims appended hereto.

I claim:

1. A wide angle rear view mirror assembly adapted to be operatively associated with the conventional main rear view mirror assembly that is normally mounted on the outer side of a motor vehicle for expanding the lateral range of vision of the main rear view mirror assembly in the same direction as that of the main rear view mirror assembly, the main rear view mirror assembly having a main frame and a main rear view mirror element mounted therein, said wide angle rear view mirror assembly comprising:

A. a supplemental frame member
B. a supplemental rear view mirror element mounted in said supplemental frame member, said supplemental mirror element being optically flat,
C. means mounting said supplemental frame member on the main rear view mirror assembly, said means including a plate member disposed in a plane perpendicular to said main mirror and supplemental mirror elements and interconnecting said main mirror and supplemental mirror elements such that said supplemental mirror element is disposed in juxtaposition with the main rear view mirror element and lies in a plane which is disposed at a first angle relative to the plane of said main mirror element, said first angle being fixed relative to the plane of said main mirror element, said mounting means also permitting pivotal movement of said supplemental frame member and said supplemental mirror element about a pivot axis that is parallel to the longitudinal axis of the main mirror element such that said supplemental frame member and said supplemental mirror element can move angularly about said parallel pivot axis through a second angle which lies in a plane that is perpendicular to said plate member, and
D. means for moving said supplemental frame member through said second angle and for maintaining said supplemental frame member and said supplemental mirror element in any given position within said second angle, wherein said supplemental mirror expands an angle of vision of a driver of said motor vehicle beyond the included angle of vision provided by the main mirror element of the main rear view mirror assembly.

2. A wide angle rear view mirror assembly as set forth in claim 1 wherein said means mounting said supplemental frame member in juxtaposition with the main frame of the main rear view mirror assembly comprises means for mounting said supplemental frame member on a portion of the surface of the main mirror element.

3. A wide angle rear view mirror assembly as set forth in claim 2 wherein said means mounting said supplemental frame member on said surface portion of the main rear view mirror assembly includes A. first means for securing said supplemental frame member to said surface of the main mirror element, and
B. second means connecting said supplemental frame member to said first means with the plane of said supplemental mirror element disposed at said first angle and which permits said angular movement of said supplemental frame member and said supplemental mirror element about said pivot axis.

4. A wide angle rear view mirror assembly as set forth in claim 3 wherein said first means includes a first plate suitably secured to said outer surface of said main mirror element.

5. A wide angle rear view mirror assembly as set forth in claim 4 wherein said second means comprises means pivotally connecting said frame member to said first plate which permits said frame member and said supplemental mirror element to move through said second angle.

6. A wide angle rear view mirror assembly as set forth in claim 5 wherein said means for moving said supplemental mirror element and for maintaining it in any given position comprises adjustable control means operatively associated with said first plate member and said frame member for moving said frame member through said second angle relative to said first plate and for maintaining said frame member in any position within said second angle to which said frame member is set.

7. A wide angle rear view mirror assembly as set forth in claim 6 wherein said adjustable control means comprises A. an elongate threaded member operatively interconnected between said first flat plate member and said frame member,
B. resilient means captured between said first flat plate member and said frame member for urging said frame member in one direction of angular movement about said pivot axis, and
C. an actuating knob rotatably mounted on said threaded member and cooperating with said frame member for moving said frame member in the opposite direction of angular movement against the bias of said resilient means, whereby manual rotation of said actuating knob moves said frame member through the extent of said second angle to adjust the elevation of said supplemental mirror element with respect to said main mirror element.

8. A wide angle rear view mirror assembly as set forth in claim 7 wherein said means pivotally connecting said frame member to said first flat plate comprises a second plate connected to said frame member and pivotally connected to said first plate, said elongate threaded member being fixedly mounted on a portion of said first plate and extending through an aperture formed on said second plate, said actuating knob bearing on an outer surface of said second plate that is remote from said portion of said first plate on which said threaded knob is mounted.

9. A wide angle rear view mirror assembly as set forth in claim 8 wherein said mounting means is mounted on said main mirror element adjacent to the upper right corner thereof, and wherein first plate includes a terminal portion thereof which projects outwardly from said main mirror element so as to be disposed substantially perpendicular thereto, said threaded member being mounted on said terminal portion of said first plate and extending upwardly therefrom through said aperture in said second plate, whereby said actuating knob is accessible to an operator of the motor vehicle on an upper portion of said mounting means adjacent said upper right corner of the main rear view mirror assembly.

10. A wide angle rear view mirror assembly as set forth in claim 8 wherein said mounting means is mounted on said main mirror element adjacent to the lower right corner thereof, and wherein said first plate includes a longitudinally extending portion projecting outwardly beyond the adjacent side edge of said main mirror element and said wide angle mirror element, said second plate including a corresponding longitudinally extending portion projecting outwardly beyond the adjacent side edge of said main mirror element and said wide angle mirror element, said threaded member being mounted on said longitudinally extending portion of said first plate and projecting through an aperture in said longitudinally extending portion of said second plate, whereby said actuating knob is accessible to an operator of the motor vehicle on a side portion of said mounting means adjacent to said lower right corner of the main rear view mirror assembly.

11. A wide angle rear view mirror assembly as set forth in claim 8 wherein said mounting means is mounted on said main mirror element adjacent to the lower left corner thereof, and wherein said first plate includes a laterally extending portion projecting outwardly beyond the adjacent longitudinal edge of said main mirror element and said wide angle mirror element, said second plate including a corresponding laterally extending portion projecting outwardly beyond the adjacent longitudinal edge of said main mirror element and said wide angle mirror element, said threaded member being mounted on said laterally extending portion of said first plate and projecting through an aperture in said laterally extending portion of said second plate, whereby said actuating knob is accessible to an operator of the motor vehicle on the lower longitudinal edge portion of said mounting means adjacent said lower left corner of the main rear view mirror assembly.

12. A wide angle rear view mirror assembly as set forth in claim 8 wherein said mounting means is mounted on said main mirror element adjacent to the upper left corner thereof, and wherein said first plate includes a longitudinally extending portion projecting outwardly beyond the adjacent side edge of said main mirror element and said wide angle mirror element, said second plate including a corresponding longitudinally extending portion projecting outwardly beyond the adjacent side edge of said main mirror element and said wide angle mirror element, said threaded member being mounted on said longitudinally extending portion of said first plate and projecting through an aperture in said longitudinally extending portion of said second plate, whereby said actuating knob is accessible to an operator of the motor vehicle on a side portion of said mounting means adjacent said upper left corner of the main rear view mirror assembly.

* * * * *